G. GRIESCHE.
FLUSHING DEVICE FOR DRAINS.
APPLICATION FILED FEB. 19, 1919.

1,314,261.

Patented Aug. 26, 1919.

INVENTOR
Gustav Griesche.
BY
Strong & Townsend
ATTORNEYS

UNITED STATES PATENT OFFICE.

GUSTAV GRIESCHE, OF BERKELEY, CALIFORNIA.

FLUSHING DEVICE FOR DRAINS.

1,314,261. Specification of Letters Patent. Patented Aug. 26, 1919.

Application filed February 19, 1919. Serial No. 278,045.

*To all whom it may concern:*

Be it known that I, GUSTAV GRIESCHE, a citizen of the United States, residing at Berkeley, in the county of Alameda and State of California, have invented new and useful Improvements in Flushing Devices for Drains, of which the following is a specification.

This invention relates to a flushing device for drains.

It is the principal object of this invention to provide a device especially adapted for use in connection with sinks and the like, and by which the drain may be flushed when it has become obstructed. Said device is designed to utilize a supply of water under pressure and is so constructed as to securely fit over the drain opening and to thus insure that the force of the water will act through the drain to break the obstructing seal therein.

Another object of the invention is to provide a device of the above character, composed of few parts of simple construction, which may be readily and cheaply manufactured and easily assembled.

The present invention contemplates the use of a cup-shaped drain member having a rigid handle by which it may be held in position over a drain opening and further connected by means of a flexible hose to a water faucet.

The invention is illustrated by way of example in the accompanying drawings, in which—

Figure 2:
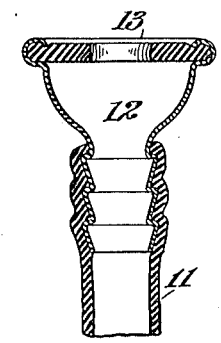
Fig. 2 is an enlarged view in section, disclosing the hose connection for the faucet.

Referring more particularly to the drawings, 10 indicates a water faucet to which is connected a flexible hose 11. This hose is provided with a socket member 12, as shown in Fig. 2. The body of the socket is cup-shaped and its enlarged mouth is fitted with a flexible diaphragm 13. A central opening is formed through this diaphragm to receive the end of the faucet 11 and thus to connect the faucet with the hose. A tubular extension is formed as a continuation of the cup 12 and is circumferentially corrugated to hold the hose thereupon. The opposite end of the hose slips over a tubular connection 14. This connection is part of a handle fitting 15 and is formed integral with a handle ferrule 16 into which a straight handle 17 is fitted. The tubular connection 14 extends obliquely to the vertically disposed ferrule and terminates within a vertical continuation which is opened into a cup 18. The cup 18 is peripherally formed of pressed metal and has a central flanged opening 19. The flange of this opening rests within an annular groove 20 around the end of the member 15, this groove being formed between an end flange 21 and an upper collar 22. The side wall of the cup flares outwardly and is then bent downwardly and inwardly to form an annular flange 23. This flange may be of any desired dimensions and its terminating lip is designed to extend inwardly and seat with a circumferental groove 24 formed around an annular member 25. The member 25 is preferably formed of rubber and is in the shape of a ring, the inside dimensions of which are substantially those of the mouth of the cup.

Figure 1:
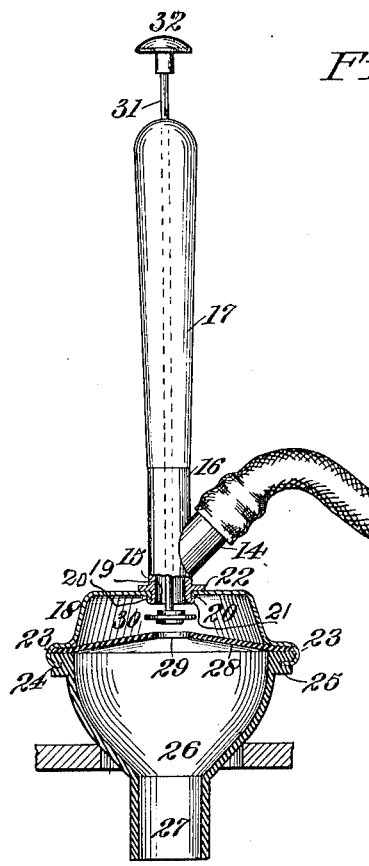
Figure 1 is a view in side elevation, showing one form of the invention with parts broken away to more clearly disclose the interior construction of the flushing bowl.
Figure 1:
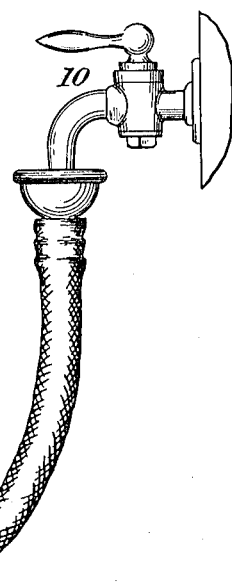

As shown in Fig. 1, the ring 25 is provided with a bell-shaped continuation 26. This part tapers downwardly and terminates with a cylindrical portion 27. By the use of such a bell, openings of various diameters may be closed and water delivered thereto without chance of leakage. It will be further observed that in the structure shown in Fig. 1, a diaphragm 28 is disclosed across the mouth of the cup 18 and fits between the outer flange of the cup and the upper face of the ring 25. This diaphragm is formed with a central opening 29. The diaphragm is normally distended in an upward direction. The opening 29 is through the center of the diaphragm and is intended to be optionally closed by a valve disk 30. This disk is carried upon the lower end of a valve stem 31. The valve stem in turn extends upwardly through the center of the handle 17 and is there fitted with a knob 32 by which the valve and its stem may be manipulated.

In operation, the pressure of the water delivered to the cup through the hose 11 will exert a desirable pressure upon the obstructing element within the drain and tend to break the seal. The drain may be filled and thereafter the diaphragm sealed by moving the valve disk 30 down upon the diaphragm opening 29. Due to the fact that there is not usually an absolute seal in the drain, it will thus be seen that the pressure of the water delivered through the hose will act upon the diaphragm and cause it to be deflected downwardly and to thus exert an additional pressure upon the water trapped between the obstruction in the drain and the diaphragm. This action should be sufficient to break the seal. In the event that greater force is required, the valve stem 31 may be manually forced downwardly and this will violently agitate the water within the drain with the result that the seal will be broken.

It will thus be seen that the flushing device here disclosed is quite desirable in its construction when considered from a manufacturing point, as it is simple and economical in design and at the same time will act effectively to produce the function intended. It will further be noted that the structure is formed of few parts and that means are provided for forcefully holding the device over a drain opening without an interruption of a supply of liquid to the drain.

While I have shown the preferred form of my invention, it will be understood that various changes in the combination, construction and arrangement of parts may be made by those skilled in the art, without departing from the spirit of the invention as claimed.

Having thus described my invention, what I claim and desire to secure by Letters Patent is—

1. A drain flushing device comprising a circular cup, an annular flange formed around the mouth thereof and having an inturned lip, a bell-shaped member having a discharge orifice in the bottom thereof and a ring formed exteriorly about its rim and said ring being provided with a circumferential groove within which the inturned lip of said cup member projects, a handle fitting extending through the head of said cup and formed with a pair of spaced shoulders, an annular flange disposed around the opening in the cup head and adapted to seat between said shoulders, an obliquely inclined tubular hose connection formed as a part of said handle fitting and communicating with the interior of the cup, a ferrule formed as a part of the handle fitting and extending along the central vertical axis of the cup, a handle mounted within the ferrule, a hose mounted upon the tubular hose connection, and a perforated diaphragm disposed across the mouth of the cup.

2. A drain flushing device comprising a circular cup, an annular flange formed around the mouth thereof and having an inturned lip, a bell-shaped member having a discharge orifice in the bottom thereof and a ring formed exteriorly about its rim and said ring being provided with a circumferential groove within which the inturned lip of said cup member projects, a handle fitting extending through the head of said cup and formed with a pair of spaced shoulders, an annular flange disposed around the opening in the cup head and adapted to seat between said shoulders, an obliquely inclined tubular hose connection formed as a part of said handle fitting and communicating with the interior of the cup, a ferrule formed as a part of the handle fitting and extending along the central vertical axis of the cup, a handle mounted within the ferrule, a hose mounted upon the tubular hose connection, a perforated diaphragm disposed across the mouth of the cup, and means for closing the perforations in said diaphragm without interrupting the flow of a liquid to the cup.

3. A drain flushing device comprising a circular cup, an annular flange formed around the mouth thereof and having an inturned lip, a bell-shaped member having a discharge orifice in the bottom thereof and a ring formed exteriorly about its rim and said ring being provided with a circumferential groove within which the inturned lip of said cup member projects, a handle fitting extending through the head of said cup and formed with a pair of spaced shoulders, an annular flange disposed around the opening in the cup head and adapted to seat between said shoulders, an obliquely inclined tubular hose connection formed as a part of said handle fitting and communicating with the interior of the cup, a ferrule formed as a part of the handle fitting and extending along the central vertical axis of the cup, a handle mounted within the ferrule, a hose mounted upon the tubular hose connection, a perforated diaphragm disposed across the mouth of the cup, and means for closing the perforations in said diaphragm without interrupting the flow of a liquid to the cup and whereby the diaphragm may be forcefully distended to exert a downward pressure upon the liquid within the drain.

4. A drain flushing device comprising two chamber members, one disposed above the other, the lower chamber being provided with a discharge orifice and the separating medium between said chambers being a flexible wall having a central aperture, means for introducing water into the upper chamber, and means for closing the aperture in said flexible wall.

5. A drain flushing device comprising two chamber members, one disposed above the other, the lower chamber being provided with a discharge orifice and the separating medium between said chambers being a flexible wall having a central aperture, means for introducing water into the upper chamber, and means for simultaneously closing the aperture in said flexible wall and exerting a downward pressure upon said wall.

6. A drain flushing device comprising a bell-shaped member having a discharge orifice in the bottom thereof, an inverted cup disposed above said bell member and coöperative means about the rims of said members, whereby their union is sealed, means for securing a diaphragm between the chambers of said members, said diaphragm having a central aperture, means for introducing water into the cup chamber, and means for closing the aperture in said diaphragm.

7. A drain flushing device comprising a flexible bell-shaped member, having a discharge orifice in the bottom thereof, an inverted cup disposed above said bell member and coöperative means about the rims of said members, whereby their union is sealed, means for securing a diaphragm between the chambers of said members, said diaphragm having a central aperture, means for introducing water into the cup chamber, and manual operating means for simultaneously closing the aperture in said diaphragm and exerting a downward pressure thereon.

8. In a drain flushing device, a circular cup, an annular flange formed around the mouth thereof and having an inturned lip, and a ring formed exteriorly about its rim, having a top flat surface for seating the rim of the cup member, said ring being provided with a circumferential groove within which the inturned lip of said cup member projects, handle fitting extending through the head of said cup and formed with a pair of spaced shoulders, an obliquely inclined tubular hose connection formed as a part of said handle fitting and communicating with the interior of the cup, a ferrule formed as a part of the handle fitting and extending along the central vertical axis of the cup, a handle mounted within the ferrule, and a hose mounted upon the tubular hose connection.

In testimony whereof I have hereunto set my hand in the presence of two subscribing witnesses.

GUSTAV GRIESCHE.

Witnesses:
JOHN H. HERRING,
W. W. HEALEY.